United States Patent
Wu et al.

(10) Patent No.: US 8,023,204 B2
(45) Date of Patent: Sep. 20, 2011

(54) COMPACT SHORT BACK FOCUS IMAGING LENS SYSTEM WITH TWO LENSES

(75) Inventors: Chien-Lin Wu, Taipei (TW); San-Woei Shyu, Taipei (TW)

(73) Assignee: E-Pin Optical Industry Co., Ltd., Taipei (TW)

( * ) Notice: Subject to any disclaimer, the term of this patent is extended or adjusted under 35 U.S.C. 154(b) by 29 days.

(21) Appl. No.: 12/558,329

(22) Filed: Sep. 11, 2009

(65) Prior Publication Data

US 2010/0085650 A1    Apr. 8, 2010

(30) Foreign Application Priority Data

Oct. 3, 2008    (TW) .............................. 97138191 A

(51) Int. Cl.
*G02B 13/18*    (2006.01)
*G02B 9/04*    (2006.01)
(52) U.S. Cl. ........................ 359/717; 359/795
(58) Field of Classification Search .................. 359/795, 359/793, 791, 785, 716, 717
See application file for complete search history.

(56) References Cited

U.S. PATENT DOCUMENTS

| | | | |
|---|---|---|---|
| 7,492,528 B2 | 2/2009 | Shyu | |
| 7,525,741 B1 * | 4/2009 | Noda | 359/795 |
| 7,715,120 B2 * | 5/2010 | Jeong | 359/784 |
| 2006/0221467 A1 | 10/2006 | Chen et al. | |

FOREIGN PATENT DOCUMENTS

| | | |
|---|---|---|
| JP | 2005-121685 | 5/2005 |
| JP | 2006-154517 | 6/2006 |
| JP | 3146386 | 11/2006 |
| WO | WO-2006/035990 A1 | 6/2006 |

* cited by examiner

Primary Examiner — Scott J Sugarman

(74) Attorney, Agent, or Firm — Muncy, Geissler, Olds & Lowe, PLLC

(57) ABSTRACT

A compact short back focus imaging lens system with two lenses is revealed and includes along the optical axis from an object side to an image side: an aperture stop, a first lens with positive refractive power that is a meniscus aspherical lens with convex surface facing the object side, a second lens with negative refractive power that is a meniscus aspherical lens with convex surface facing the image side, an IR cut-off filter and an image sensor. Moreover, the following conditions are satisfied by the imaging lens system:

$$-0.3 \le \frac{f_1}{f_2} \le -0.01$$

$$0.25 \le \frac{bf}{TL} \le 0.4$$

wherein $f_1$ is focal length of the first lens, $f_2$ is focal length of the second lens, bf is back focal length of the imaging lens system, and TL (overall length) is the distance from the aperture stop to the image plane. Thus, the imaging lens system of the present invention has short back focal length effects and reduced overall length so as to achieve the requirement of minimized volume for mobile phones or mini-cameras.

4 Claims, 8 Drawing Sheets ompact short back focus imaging lens system with two lenses, especially to an imaging lens system for mini-cameras or mobile phones with image sensors such as CCD (Charge Coupled Device) or CMOS (Complementary Metal Oxide Semiconductor), which is formed by one positive lens and one negative lens and is with features of short back focal length, short overall (total) length and low cost.

COMPACT SHORT BACK FOCUS IMAGING LENS SYSTEM WITH TWO LENSES

BACKGROUND OF THE INVENTION

The present invention relates to a compact short back focus imaging lens system with two lenses, especially to an imaging lens system for mini-cameras or mobile phones with image sensors such as CCD (Charge Coupled Device) or CMOS (Complementary Metal Oxide Semiconductor), which is formed by one positive lens and one negative lens and is with features of short back focal length, short overall (total) length and low cost.

The electronics available now become more compact and multifunctional. Most of them such as digital still cameras, PC (personal computer) cameras, network cameras and mobile phones, even personal digital assistants (PDA) are equipped with an imaging lens system. The imaging lens system not only requires good imaging quality but also needs compact volume (short overall length) and lower cost so as to match users' requirements.

There are various designs such as two lenses, three lenses, four lenses or five lenses of the imaging lens system applied to mini electronics. Yet while a compromise of resolution and cost, the two lenses is preferred. There are various structures of conventional two lenses imaging lens system and the difference among them or technical character is in the shape of the two lenses, location of the convex surface/concave surface, positive/negative refractive power, or relative optical parameters. Among these designs, the combination of a first lens with positive refractive power and a second lens with positive refractive power can achieve requirement of minimized volume, such as prior arts disclosed in US2005/0073753, US2004/0160680, U.S. Pat. No. 7,110,190, U.S. Pat. No. 7,088,528, EP1793252, EP1302801, JP2007-156031, JP2006-154517, JP2006-189586, TWM320680, TWI232325, and CN101046544 etc. However, the overall length of these imaging lens systems still requires further improvement to be reduced. For the user's requirement of short back focal length, the imaging lens systems disclosed in US2006/0221467, JP2005-121685 and JP2006-154517, use the combinations of a lens with positive refractive power and a lens with negative refractive power, the imaging lens system disclosed in US2003/0197956 uses the combinations of a lens with negative refractive power and a lens with positive refractive power, the imaging lens system disclosed in U.S. Pat. No. 5,835,288 is formed by the combinations of a biconcave lenses and a biconvex lenses, the imaging lens system disclosed in JP2004-0281830 uses the combinations of a lens with positive/negative refractive power and a lens with positive refractive power. Or the imaging lens systems disclosed in JP2003-215446, JP2004-177976, EP1793252, EP1793254, U.S. Pat. No. 6,876,500, US2004/0160680, U.S. Pat. No. 7,088,528, U.S. Pat. No. 7,492,528, JP 3146386, TWI266074, use the combination of two lenses with positive refractive power so as to reduce the overall length. Therefore, in the different designs for reducing the overall length of the imaging lens system with two lenses, it is effective to design a short back focus imaging lens system. But the design with reducing the back focal length will cause the difficulty for adjusting the focal length of the imaging lens. Thus, the present invention provides a better design of the imaging lens system by reducing the back focal length as well as the air gaps between lenses so as to decrease the difficulty for adjusting the focal length and the distortion of image in order to let the imaging lens system be conveniently applied to mini cameras and camera phones.

SUMMARY OF THE INVENTION

Therefore it is a primary object of the present invention to provide a compact short back focus imaging lens system with two lenses, along an optical axis from an object side to an image side including: an aperture stop; a first lens with positive refractive power that is a meniscus lens with two aspherical surfaces and a convex surface facing the object side; a second lens with negative refractive power that is a meniscus lens with two aspherical surfaces and a convex surface facing the image side; an IR cut-off filter; and an image sensor. Moreover, the imaging lens system with two lenses satisfies the following conditions:

$$0.25 \leq \frac{d_2 + d_4 + d_6}{f_s} \leq 0.4 \quad (1)$$

$$0.25 \leq \frac{bf}{TL} \leq 0.4 \quad (2)$$

$$-0.3 \leq \frac{f_1}{f_2} \leq -0.01 \quad (3)$$

$$-4.0 \leq \frac{(R_2 - R_3)}{(R_2 + R_3)} \leq -1.5 \quad (4)$$

$$0.1 \leq \frac{d_2}{f_s} \leq 0.2 \quad (5)$$

wherein $f_s$ is effective focal length of the imaging lens system, bf is back focal length of the imaging lens system, TL (total length) is distance from the aperture stop to the image plane of the image sensor, $f_1$ is focal length of the first lens, $f_2$ is focal length of the second lens, $d_2$ is distance on optical axis from the image side of the first lens to the object side of the second lens, $d_4$ is distance on optical axis from the image side of the second lens to the object side of the IR cut-off filter, $d_6$ is distance on optical axis from the image side of the IR cut-off filter to the image plane of the image sensor, $R_2$ is the radius of curvature of the image-side optical surface on the optical axis of the first lens, and $R_3$ is the radius of curvature of the object-side optical surface on the optical axis of the second lens.

Furthermore, the first lens and the second lens are made from glass or plastic.

Thereby, the imaging lens system according to the present invention achieves short back focal length and has features of short overall length, and low cost so as to have broader applications.

DETAILED DESCRIPTION OF THE PREFERRED EMBODIMENT

Figure 1:
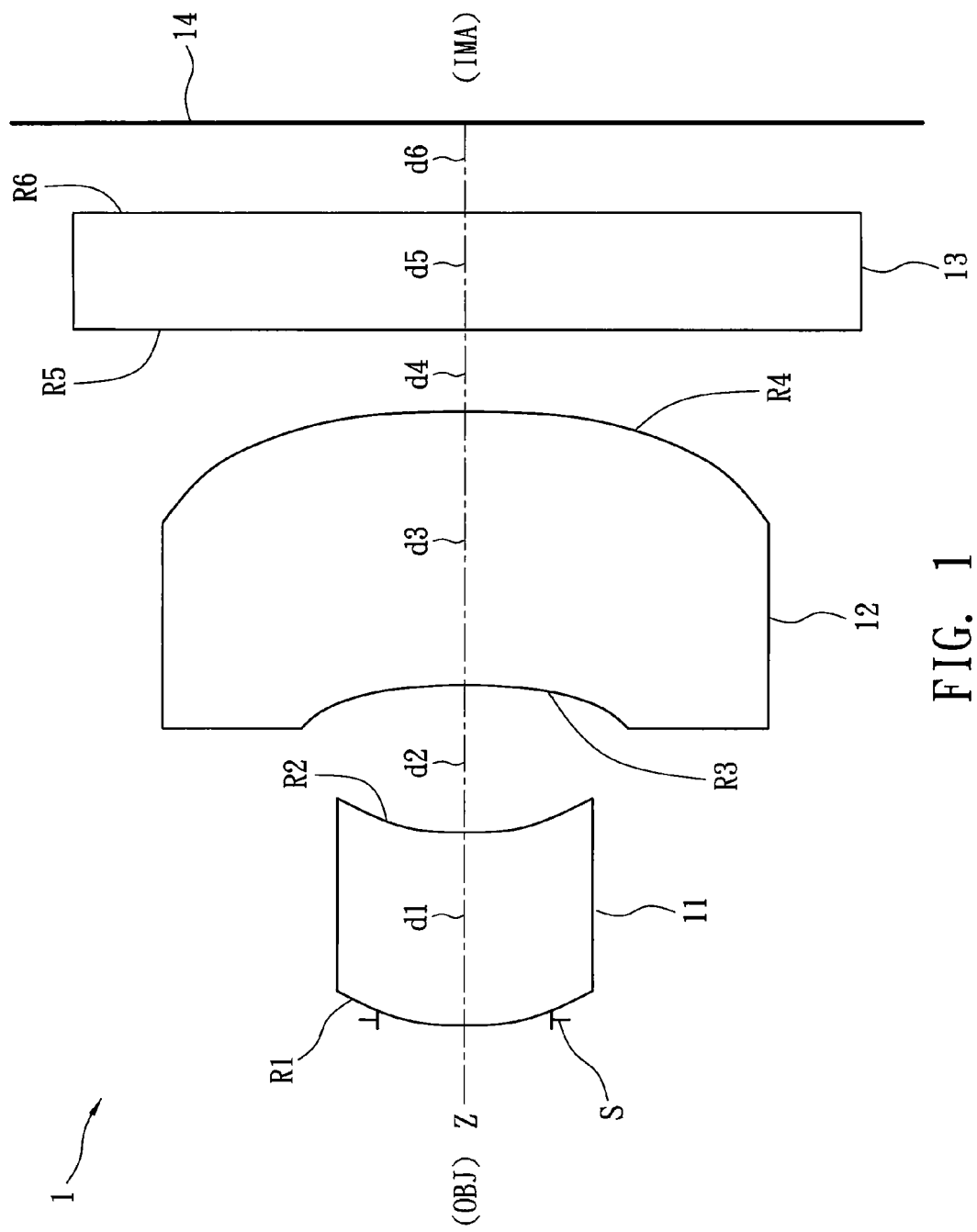
FIG. 1 is a schematic drawing showing optical structure of an embodiment according to the present invention.

Refer to FIG. 1, along an optical axis Z from the object side to the image side, an imaging lens system 1 according to the present invention consists of an aperture stop S, a first lens 11, a second lens 12, an IR (infrared) cut-off filter 13 and an image sensor 14. The first lens 11 is a meniscus lens with positive refractive power and the surface on the object side R1 is a convex surface while the surface on the image side R2 is a concave surface. The first lens 11 is made from glass or plastic. Moreover, both the surfaces of the object side R1 and the image side R2 of the first lens 11 are aspherical surfaces.

The second lens 12 is a meniscus lens with negative refractive power and the surface on the object side R3 is a concave surface while the surface on the image side R4 is a convex surface. The second lens 12 is made from glass or plastic. Moreover, both the surfaces of the object side R3 and the image side R4 of the second lens 12 are aspherical surfaces.

The aperture stop S is a front-positioned aperture that is attached on the surface on the object side R1 of the first lens 11. The IR cut-off filter 13 is a lens or a film filtering IR light formed by coating. The image sensor 14 is a CCD or a CMOS.

Figure 2:
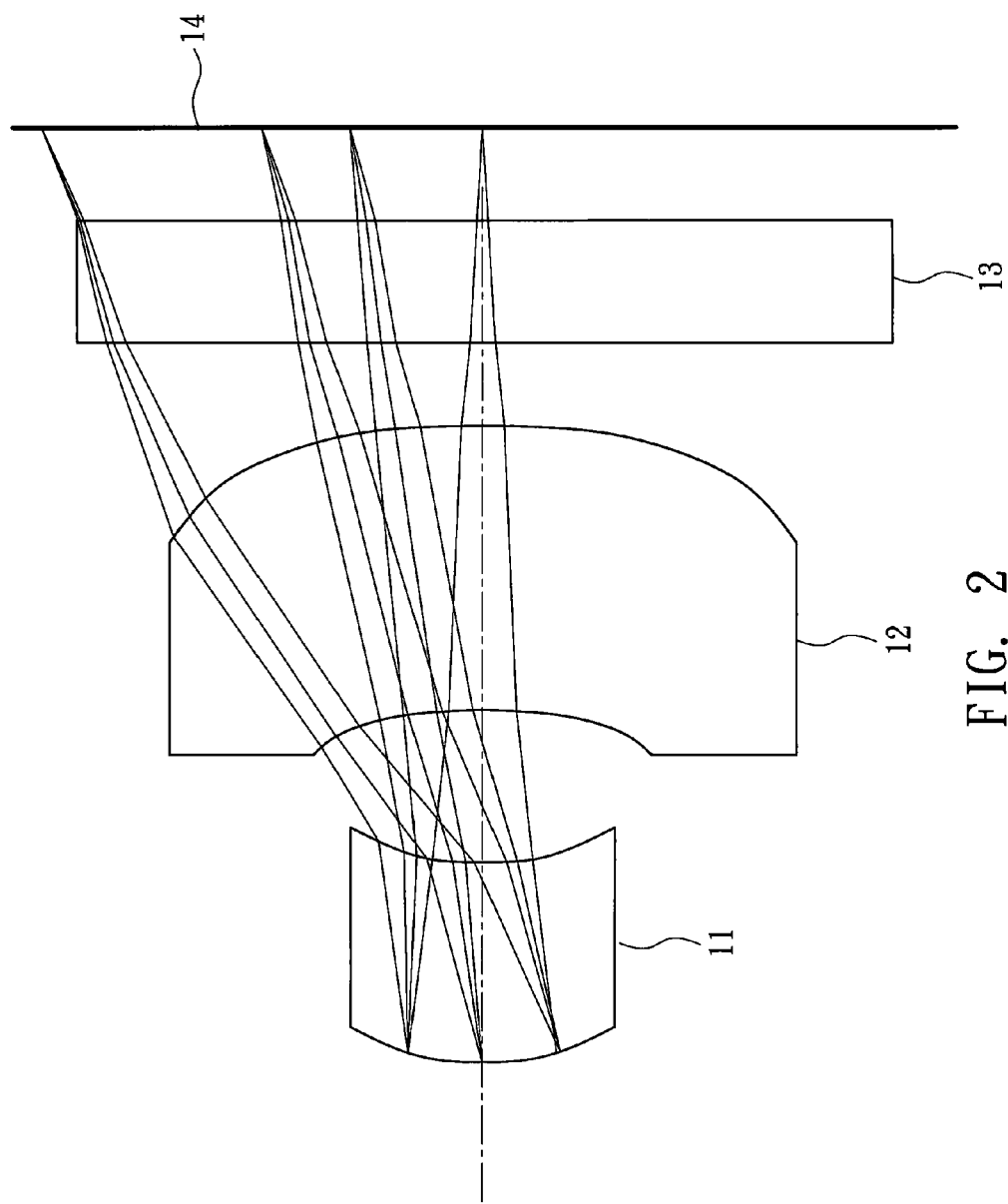
FIG. 2 is a schematic drawing showing light path of an embodiment according to the present invention.

Refer to FIG. 2, while capturing images, light from the object passes the first lens 11, the second lens 12, and the IR cut-off filter 13 to form an image on the image sensor 14. Through optical combinations of the radius of curvature of the optical surface and the aspherical surface of the first lens 11 as well as the second lens 12, the lens thickness (d1, d3) and the air gap/spacing (d2, d4, d6), the imaging lens system of the present invention has a short back focal length, furthermore reduces the overall length and the back focal length to be within a smaller extent, that is satisfying the equation (2). The aspherical Surface Formula is the following equation (6):

$$Z = \frac{ch^2}{1 + \sqrt{(1-(1+K)c^2h^2)}} + A_4h^4 + A_6h^6 + A_8h^8 + A_{10}h^{10} + A_{12}h^{12} + A_{14}h^{14} \quad (6)$$

wherein c is a radius of curvature, h is height of the lens, K is a conic constant, $A_4 \sim A_{14}$ respectively are 4th, 6th, 8th, 10th, 12th, and $14^{th}$ order aspherical coefficient.

According to the above structure, the back focal length of the imaging lens system 1 of the present invention is effectively minimized so that the overall length of the lens system is reduced and is satisfying the equations (1)~(5). Furthermore, the aberration is further corrected and the chief ray angle is reduced.

Refer to a list one of each embodiment: the list includes data of optical surface number (#) in order from the object side to the image side, the radius of curvature R (mm) of each optical surface on the optical axis, the on-axis surface spacing d (mm) of each optical surface, the refractive index $N_d$ of the lens and the Abbe's number $v_d$ of the lens. The optical surface of the lens labeled with * is an aspherical surface.

The First Embodiment

Refer to FIG. 2-5, show the optical path and field curvature, distortion and vertical aberration (while radius is 0.6086 mm) of image of this embodiment, respectively.

| | | List 1: fs = 3.408 | | | |
|---|---|---|---|---|---|
| Surface | Lens | R | d | Nd | υd |
| Object | | ∞ | | | |
| 1(Stop) | *R1 | 0.9451 | 0.831 | 1.587 | 60.0 |
| 2 | *R2 | 1.4749 | 0.606 | | |
| 3 | *R3 | −2.6089 | 1.133 | 1.587 | 60.0 |
| 4 | *R4 | −4.2356 | 0.330 | | |
| 5 | R5 | ∞ | 0.500 | 1.517 | 64.17 |
| 6 | R6 | ∞ | 0.363 | | |
| Image | | ∞ | | | |

*aspherical surface

| | List 2: | | | | | | |
|---|---|---|---|---|---|---|---|
| | K | A4 | A6 | A8 | A10 | A12 | A14 |
| *R1 | 7.2509E−02 | −1.2766E−01 | 1.7993E+00 | −1.4137E+01 | 5.9805E+01 | −1.3135E+02 | 1.1763E+02 |
| *R2 | 8.4914E+00 | 4.4620E−02 | 5.4374E−01 | −1.5469E+00 | 4.1302E+00 | −2.4597E+00 | 0.0000E+00 |
| *R3 | 1.4394E+01 | −1.8524E−01 | −5.0197E−01 | 1.1023E+00 | −1.9051E+00 | 0.0000E+00 | 0.0000E+00 |
| *R4 | 1.8819E+00 | −2.8780E−02 | −8.5916E−02 | −3.1650E−02 | 2.2916E−01 | −2.6495E−01 | 1.2800E−01 |

In this embodiment, the first lens 11 and the second lens 12 are made from the same glass with the refractive index $N_d$ of 1.587 and Abbe's number $v_{d1}$ of 60.0. The IR cut-off filter 13 is made from glass with the refractive index $N_d$ of 1.517 and Abbe's number $v_{d1}$ of 64.17.

The fs is 3.408 mm, $f_1$ is 2.7879 mm, $f_2$ is −15.418 mm, TL is 3.763 mm, satisfying from the equation (1) to the equation (5).

$$\frac{d_2 + d_4 + d_6}{f_s} = 0.3811;$$

$$\frac{f_1}{f_2} = -0.1808;$$

$$\frac{bf}{TL} = 0.350;$$

$$\frac{(R_2 - R_3)}{(R_2 + R_3)} = -3.6101;$$

and $$\frac{d_2}{f_s} = 0.1780$$

Figures 3, 4:
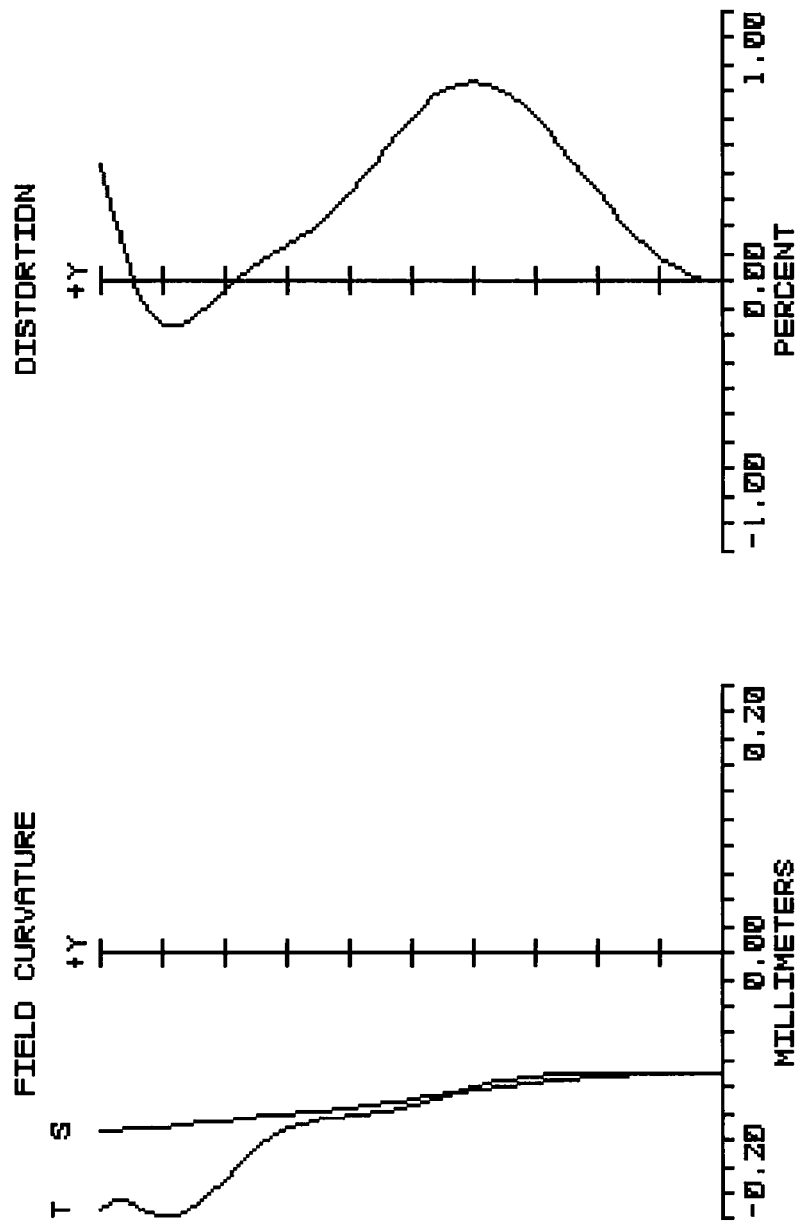
FIG. 3 shows field curvature of image of the first embodiment according to the present invention.
FIG. 4 shows distortion of image of the first embodiment according to the present invention.
Figure 5:
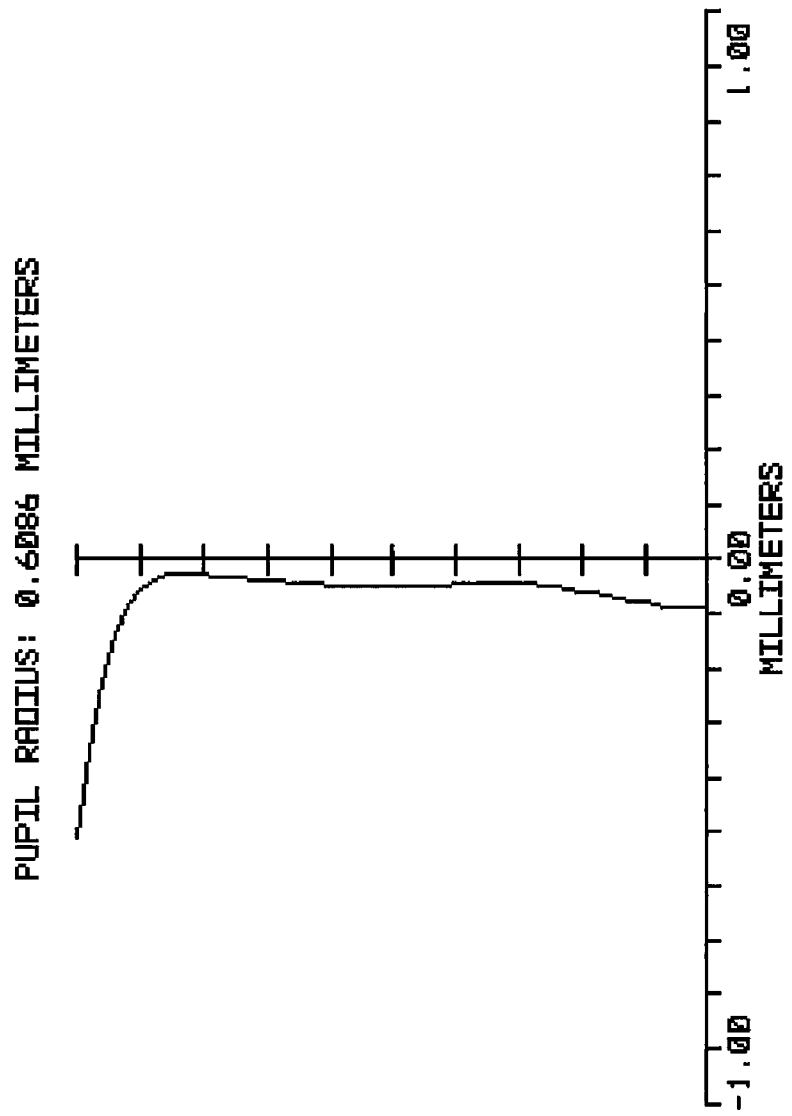
FIG. 5 shows vertical aberration of image (while radius is 0.6086 mm) of the first embodiment according to the present invention.

According to the lists 1, 2 and FIG. 3-5, this embodiment can correct the aberration and can achieve the high resolution and short back focus effects, and can effectively reduce the total overall length (TL) so as to have broader applications.

The Second Embodiment

Refer to FIG. 2 & FIG. 6-8.

| List 3 | | | | | |
|---|---|---|---|---|---|
| fs = 3.129 | | | | | |
| Surface | Lens | R | d | Nd | υd |
| Object | | ∞ | | | |
| 1(Stop) | *R1 | 0.9371 | 0.824 | 1.587 | 60.0 |
| 2 | *R2 | 1.5000 | 0.452 | | |
| 3 | *R3 | −3.3205 | 1.085 | 1.587 | 60.0 |
| 4 | *R4 | −3.8901 | 0.313 | | |
| 5 | R5 | ∞ | 0.700 | 1.517 | 64.17 |
| 6 | R6 | ∞ | 0.222 | | |
| Image | | ∞ | | | |

*aspherical surface

| List 4 | | | | | | |
|---|---|---|---|---|---|---|
| K | A4 | A6 | A8 | A10 | A12 | A14 |
| *R1 3.0726E−01 | −1.2599E−01 | 1.8009E+00 | −1.4144E+01 | 5.9403E+01 | −1.3158E+02 | 1.2121E+02 |
| *R2 2.2171E+00 | 4.1705E−02 | 5.4018E−01 | −1.5075E+00 | 8.2928E+00 | −6.5863E+00 | 0.0000E+00 |
| *R3 1.2770E+01 | −1.8944E−01 | −5.1639E−01 | 1.0845E+00 | −2.4199E+00 | 0.0000E+00 | 0.0000E+00 |
| *R4 1.5449E+01 | −3.0803E−02 | −8.6594E−02 | −3.2235E−02 | 2.2793E−01 | −2.6552E−01 | 1.2771E−01 |

In this embodiment, the first lens 11 and the second lens 12 are made from the same glass with the refractive index $N_d$ of 1.587 and Abbe's number $v_{d1}$ of 60.0. The IR cut-off filter 13 is made from glass with the refractive index $N_d$ of 1.517 and Abbe's number $v_{d1}$ of 64.17.

The fs is 3.129 mm, $f_1$ is 2.7719 mm, $f_2$ is −130.8 mm, TL is 3.5959 mm, satisfying from the equation (1) to the equation (4).

$$\frac{d_2 + d_4 + d_6}{f_s} = 0.3155;$$

$$\frac{f_1}{f_2} = -0.0212;$$

$$\frac{bf}{TL} = 0.3946;$$

$$\frac{(R_2 - R_3)}{(R_2 + R_3)} = -2.6480;$$

and $$\frac{d_2}{f_s} = 0.1446$$

Figure 7:
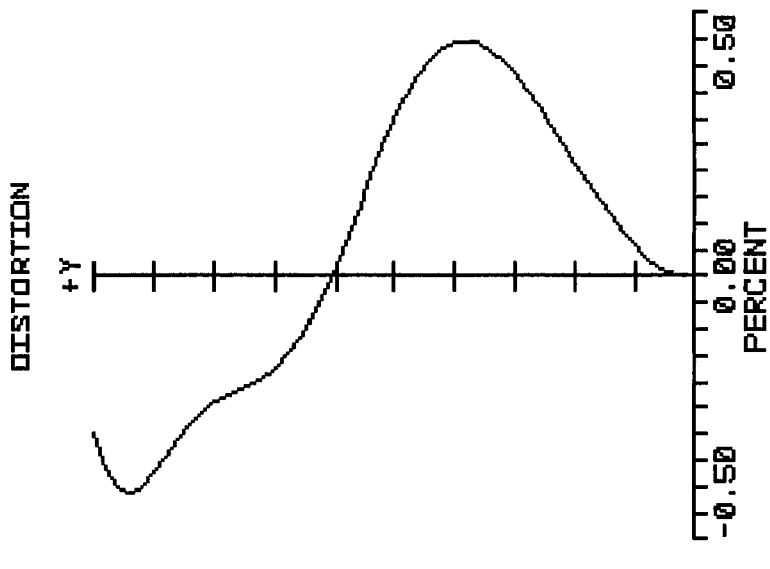
FIG. 7 shows distortion of image of the second embodiment according to the present invention.
Figure 6:
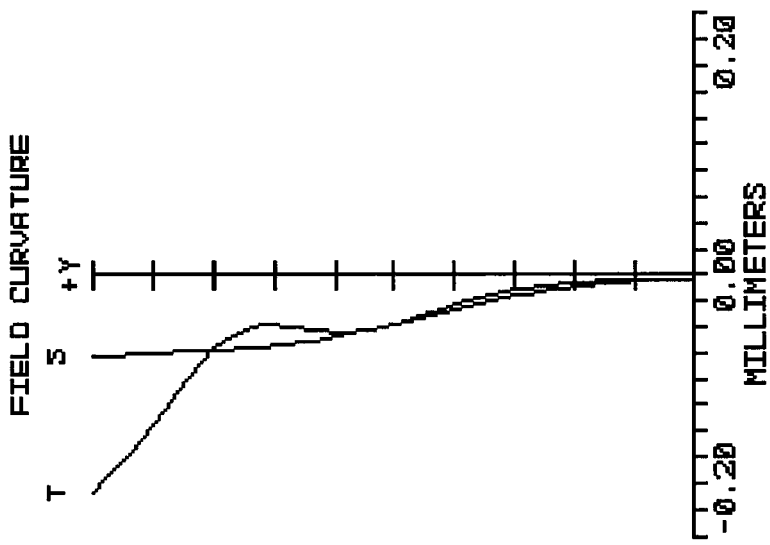
FIG. 6 shows field curvature of image of the second embodiment according to the present invention.
Figure 8:
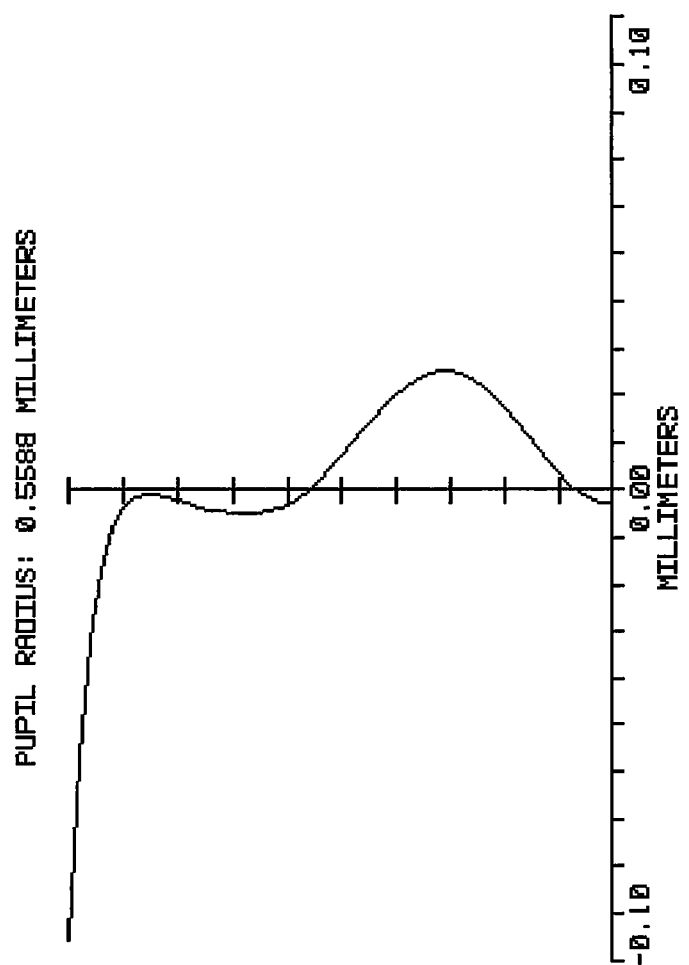
FIG. 8 shows vertical aberration of image (while radius is 0.5588 mm) of the second embodiment according to the present invention.

According to the lists 3, 4 and FIG. 6-8, this embodiment can correct the aberration and can achieve the high resolution and short back focus effects, and can effectively reduce the total overall length (TL) so as to have broader applications.

The Third Embodiment

Refer to FIG. 2 & FIG. 9-11.

| List 5 | | | | | |
|---|---|---|---|---|---|
| fs = 2.878 | | | | | |
| Surface | $L$ens | R | d | Nd | υd |
| Object | | ∞ | | | |
| 1(Stop) | *R1 | 0.8697 | 0.692 | 1.580 | 58.9 |
| 2 | *R2 | 1.5353 | 0.512 | | |
| 3 | *R3 | −4.7362 | 1.125 | 1.580 | 58.9 |
| 4 | *R4 | −19.0432 | 0.100 | | |
| 5 | R5 | ∞ | 0.700 | 1.517 | 64.17 |

-continued

| List 5 | | | | | |
|---|---|---|---|---|---|
| fs = 2.878 | | | | | |
| Surface | $L$ens | R | d | Nd | υd |
| 6 | R6 | ∞ | 0.222 | | |
| Image | | ∞ | | | |

*aspherical surface

| List 6 | | | | | | |
|---|---|---|---|---|---|---|
| K | A4 | A6 | A8 | A10 | A12 | A14 |
| *R1 1.6398E−01 | −1.2320E−01 | 8.7112E−01 | −3.7158E+00 | 2.6497E+00 | 2.7326E+00 | 2.0840E+01 |
| *R2 6.0971E+00 | 2.6171E−01 | −1.6968E+00 | 1.1420E+01 | −4.2238E+00 | −1.1136E+02 | 2.2379E+02 |
| *R3 −3.1297E+02 | −2.7133E−01 | −1.7717E+00 | 7.9263E+00 | −9.4245E+00 | −4.5828E+01 | 1.4460E+02 |
| *R4 8.5842E+01 | −4.8528E−02 | −1.0180E−01 | 7.5329E−02 | −2.6834E−02 | −1.0559E−04 | −3.8768E−04 |

In this embodiment, the first lens 11 and the second lens 12 are made from the same glass with the refractive index $N_d$ of 1.580 and Abbe's number $v_{d1}$ of 58.9. The IR cut-off filter 13 is made from glass with the refractive index $N_d$ of 1.517 and Abbe's number $v_{d1}$ of 64.17.

The fs is 2.878 mm, $f_1$ is 2.4924 mm, $f_2$ is −11.1504 mm, TL is 3.3509 mm, satisfying from the equation (1) to the equation (4).

$$\frac{d_2 + d_4 + d_6}{f_s} = 0.2898;$$

$$\frac{f_1}{f_2} = -0.2235;$$

-continued $$\frac{bf}{TL} = 0.3551;$$

$$\frac{(R_2 - R_3)}{(R_2 + R_3)} = -1.9593;$$

and $$\frac{d_2}{f_s} = 0.1778$$

Figure 10:
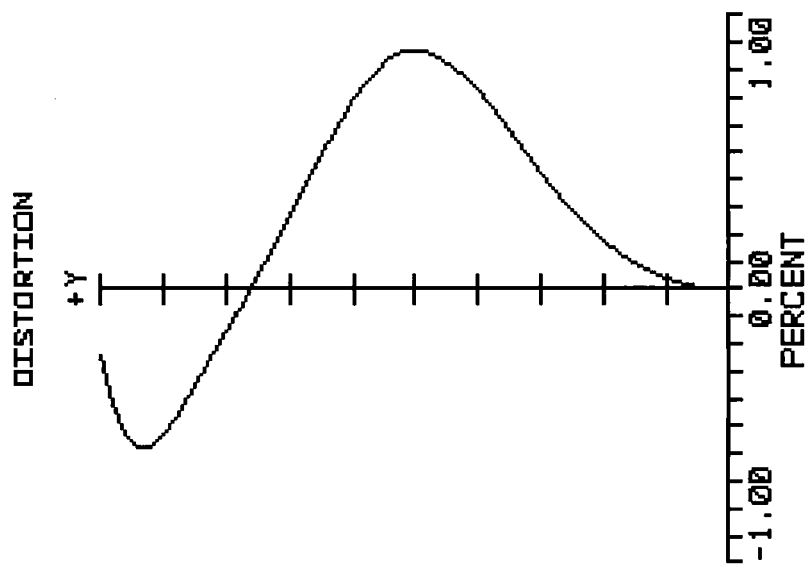
FIG. 10 shows distortion of image of the third embodiment according to the present invention.
Figure 9:
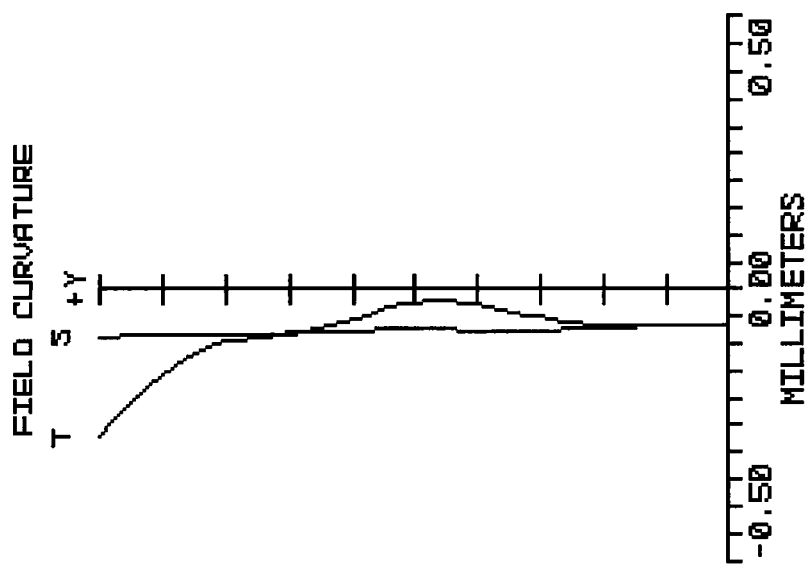
FIG. 9 shows field curvature of image of the third embodiment according to the present invention.
Figure 11:
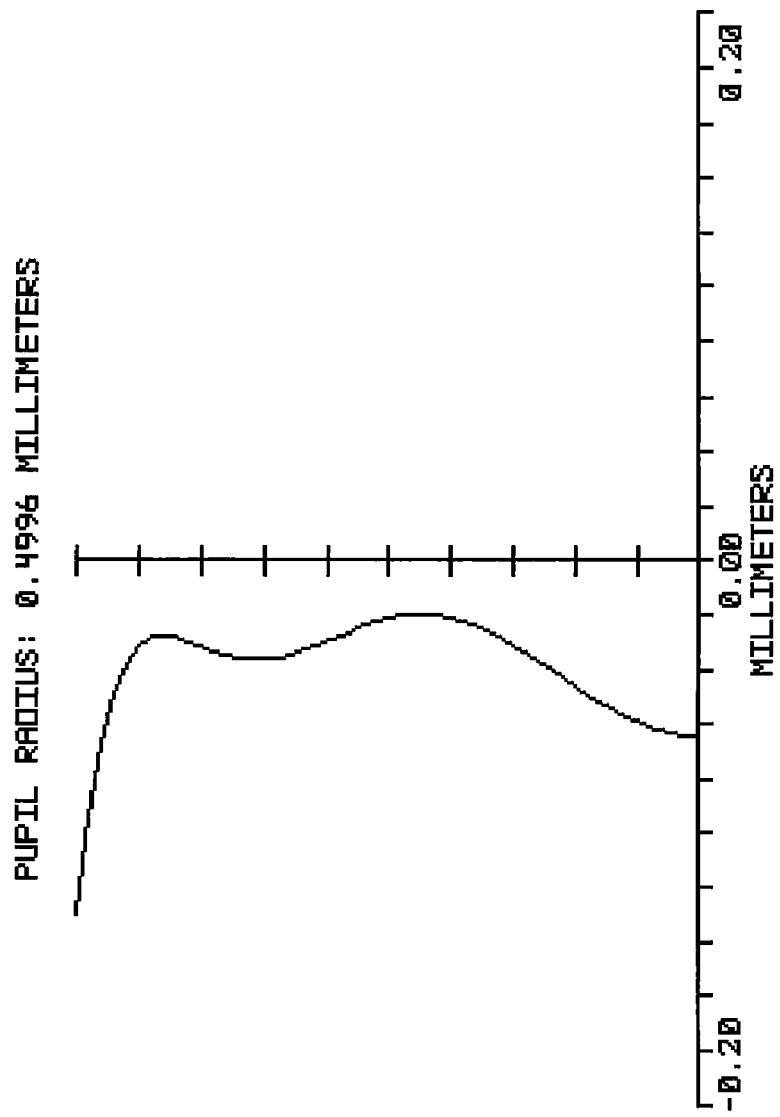
FIG. 11 shows vertical aberration of image (while radius is 0.4996 mm) of the third embodiment according to the present invention.

According to the lists 5, 6 and FIG. 9-11, this embodiment can correct the aberration and can achieve the high resolution and short back focus effects, and can effectively reduce the total overall length (TL) so as to have broader applications.

What is claimed is:

1. A compact short back focus imaging lens system with two lenses, along an optical axis from an object side to an image side, comprising:
    an aperture stop;
    a first lens with positive refractive power that is a meniscus lens with two aspherical surfaces and a convex surface facing the object side;
    a second lens with negative refractive power that is a meniscus lens with two aspherical surfaces and a convex surface facing the image side;
    an IR cut-off filter; and
    an image sensor; wherein the following conditions are satisfied:

$$0.25 \leq \frac{d_2 + d_4 + d_6}{f_s} \leq 0.4$$

$$-0.3 \leq \frac{f_1}{f_2} \leq -0.01$$

$$0.25 \leq \frac{bf}{TL} \leq 0.4$$

wherein $d_2$ is distance on optical axis from the image side of the first lens to the object side of the second lens, $d_4$ is distance on optical axis from the image side of the second lens to the object side of the IR cut-off filter, $d_6$ is distance on optical axis from the image side of the IR cut-off filter to the image plane of the image sensor, $f_s$ is effective focal length of the imaging lens system, $f_1$ is focal length of the first lens, $f_2$ is focal length of the second lens, bf is back focal length of the imaging lens system, and TL is distance from the aperture stop to an image plane.

2. The compact short back focus imaging lens system with two lenses as claimed in claim 1, wherein the imaging lens system has short back focal length with the following condition satisfied:

$$0.1 \leq \frac{d_2}{f_s} \leq 0.2$$

wherein $d_2$ is distance on optical axis from the image side of the first lens to the object side of the second lens, and $f_s$ is effective focal length of the imaging lens system.

3. The compact short back focus imaging lens system with two lenses as claimed in claim 1, wherein the imaging lens system further satisfies the following condition:

$$-4.0 \leq \frac{(R_2 - R_3)}{(R_2 + R_3)} \leq -1.5$$

wherein $R_2$ is the radius of curvature of the image-side optical surface on the optical axis of the first lens, and $R_3$ is the radius of curvature of the object-side optical surface on the optical axis of the second lens.

4. The compact short back focus imaging lens system with two lenses as claimed in claim 1, wherein there are only two lenses.

* * * * *